US012587552B2

(12) United States Patent
Cheong et al.

(10) Patent No.: US 12,587,552 B2
(45) Date of Patent: Mar. 24, 2026

(54) TIME SERIES ANOMALY DETECTION METHOD USING GRU-BASED MODEL

(71) Applicant: RESEARCH & BUSINESS FOUNDATION SUNGKYUNKWAN UNIVERSITY, Suwon-si (KR)

(72) Inventors: Yungyung Cheong, Suwon-si (KR); Changmin Seong, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 665 days.

(21) Appl. No.: 18/098,777

(22) Filed: Jan. 19, 2023

(65) Prior Publication Data

US 2024/0048575 A1      Feb. 8, 2024

(30) Foreign Application Priority Data

Aug. 3, 2022      (KR) ........................ 10-2022-0096757

(51) Int. Cl.
H04L 9/40          (2022.01)
H04L 41/16         (2022.01)
(52) U.S. Cl.
CPC .......... H04L 63/1425 (2013.01); H04L 41/16 (2013.01)
(58) Field of Classification Search
None
See application file for complete search history.

(56) References Cited

U.S. PATENT DOCUMENTS

| 12,231,559 B2 * | 2/2025 | Dods | G06N 3/0464 |
| 2021/0377131 A1 * | 12/2021 | Zilberman | G06N 3/0464 |

(Continued)

FOREIGN PATENT DOCUMENTS

| CN | 114139677 A * | 3/2022 | G06N 3/044 |
| JP | 6844301 B2 * | 3/2021 | G06V 10/82 |

(Continued)

OTHER PUBLICATIONS

"False Data Injection Attack Detection in a Power Grid using RNN", Deng et al, 6 pages (Year: 2018).*

(Continued)

*Primary Examiner* — Haimei Jiang

(57) ABSTRACT

Provided is a time series anomaly detection method using a GRU-based model. The method includes inputting time series data from a predetermined second to 1 second before a target point in time into a stacked GRU, outputting an output of the stacked GRU after passing through a fully connected layer, adding data from the predetermined second before the target point in time to an output value that has passed through the fully connected layer via a skip connection, and learning the GRU-based model to obtain predicted data at the target time point through actual data at the target time point and mean square error (MSE) loss on the basis of the added data. A similarity calculation unit is additionally provided to the GRU-based model, and the similarity calculation unit receives the time series data, generates latent variables, calculates a sum of similarities, and reflects importance of the latent variables, thereby learning the GRU-based model. This calculates a sum of similarities between variables and reflects importance in predicting data at a target point in time, so that the performance of a time series anomaly detection system can be improved.

5 Claims, 6 Drawing Sheets

(56)        References Cited

U.S. PATENT DOCUMENTS

| | | | |
|---|---|---|---|
| 2022/0188343 A1* | 6/2022 | Uysal | G06F 16/2474 |
| 2023/0307908 A1* | 9/2023 | Sun | G06N 3/045 |

FOREIGN PATENT DOCUMENTS

| | | | | |
|---|---|---|---|---|
| JP | 6994812 B2 * | 1/2022 | | |
| KR | 10-2020-0047272 A | 5/2020 | | |
| KR | 10-2294800 B1 | 8/2021 | | |
| KR | 10-2383139 B1 | 4/2022 | | |
| KR | 10-2022-0058626 A | 5/2022 | | |
| KR | 20220058626 A * | 5/2022 | | G06N 3/08 |
| KR | 102419782 B1 * | 7/2022 | | G05B 23/0283 |

OTHER PUBLICATIONS

"Real-Time Detection of False Data Injection Attacks in Smart Grid: A Deep Learning-Based Intelligent Mechanism", He et al, 12 pages (Year: 2017).*

A novel wide & deep transfer learning stacked GRU framework for network intrusion detection: Singh et al, 15 pages (Year: 2021).*

Notice of Allowance for Korean Patent Application No. 10-2022-0096757, dated Jan. 23, 2026.

* cited by examiner

【FIG. 1】
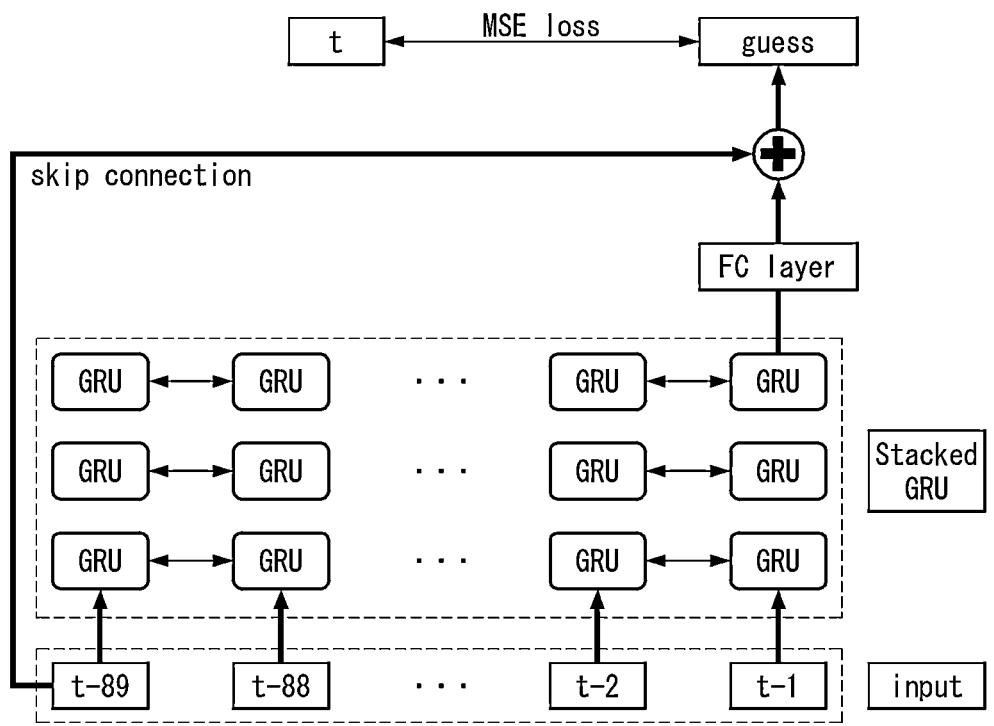

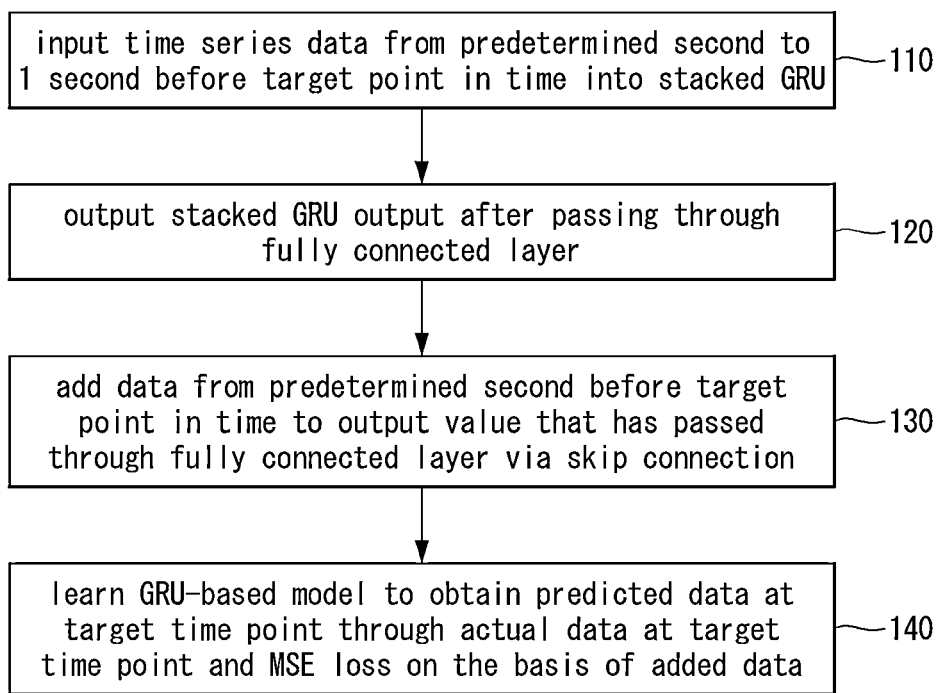

input time series data from predetermined second to 1 second before target point in time into stacked GRU ～110 output stacked GRU output after passing through fully connected layer ～120 add data from predetermined second before target point in time to output value that has passed through fully connected layer via skip connection ～130 learn GRU-based model to obtain predicted data at target time point through actual data at target time point and MSE loss on the basis of added data ～140

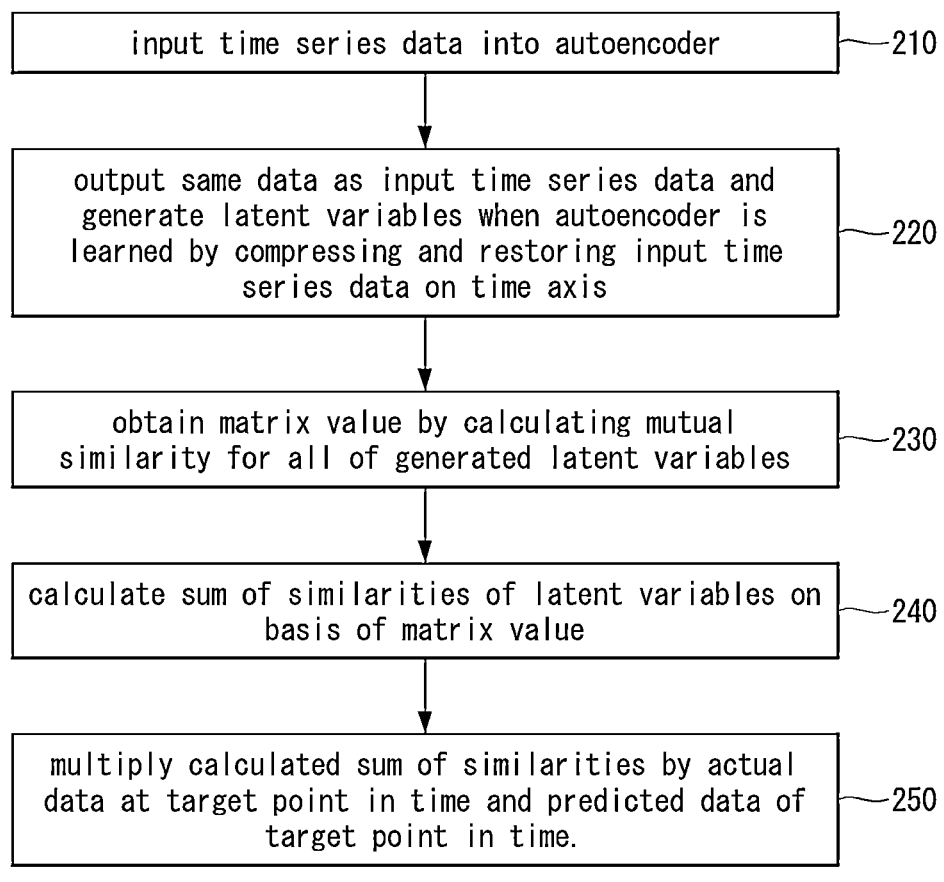

input time series data into autoencoder ———210 output same data as input time series data and generate latent variables when autoencoder is learned by compressing and restoring input time series data on time axis ———220 obtain matrix value by calculating mutual similarity for all of generated latent variables ———230 calculate sum of similarities of latent variables on basis of matrix value ———240 multiply calculated sum of similarities by actual data at target point in time and predicted data of target point in time. ———250

200

【FIG. 5】
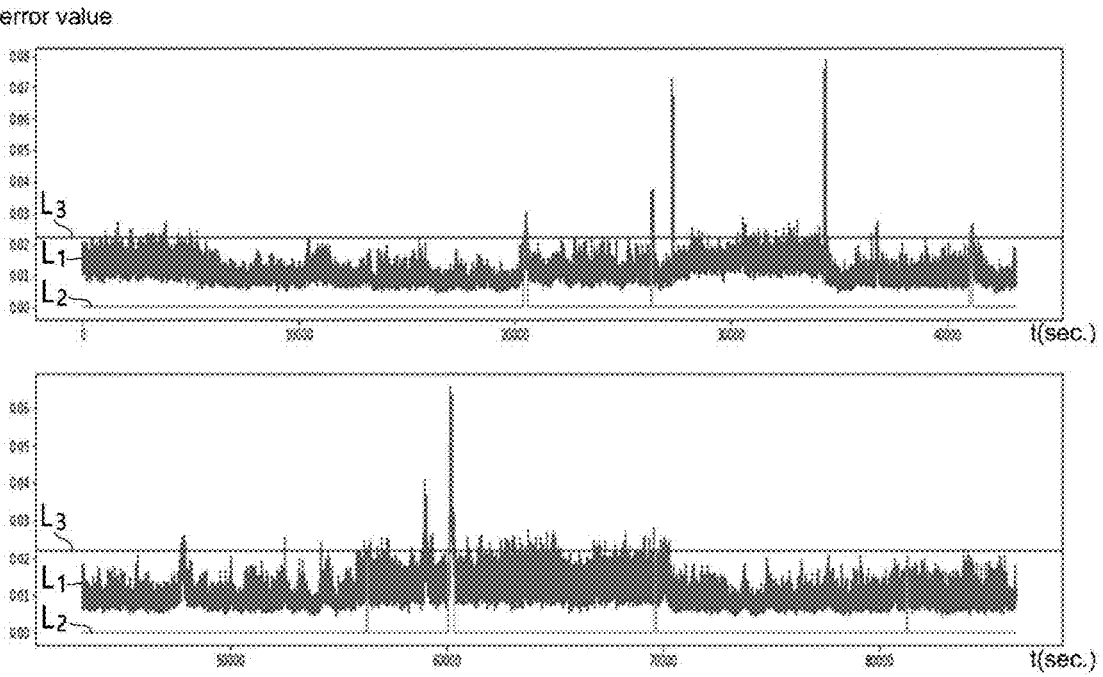
【FIG. 6】
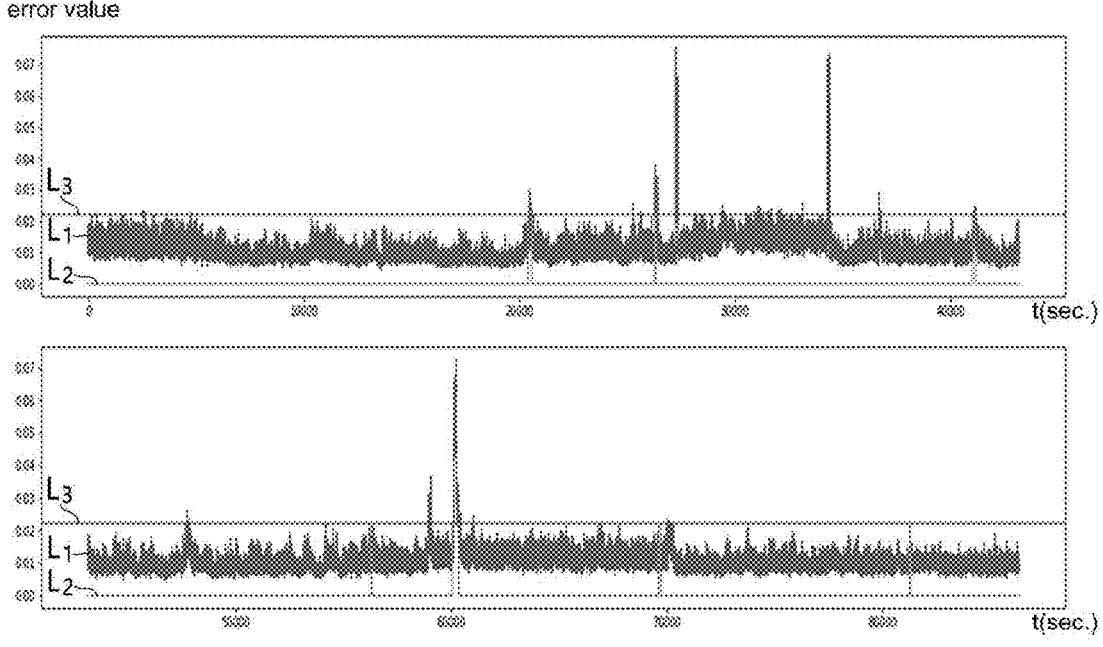

【FIG. 7】

| dataset | HAI 22.04 | | WADI | |
|---|---|---|---|---|
| evaluation indicator | baseline GRU model | proposed GRU model | baseline GRU model | proposed GRU model |
| Accuracy | 0.988 | 0.990 | 0.967 | 0.968 |
| Precision | 0.378 | 0.524 | 0.653 | 0.652 |
| Recall | 0.328 | 0.323 | 0.316 | 0.350 |
| F1 Score | 0.351 | 0.400 | 0.426 | 0.455 |
| TaP | 0.100 | 0.185 | 0.130 | 0.128 |
| TaR | 0.145 | 0.176 | 0.294 | 0.480 |
| TaPR-F1 Score | 0.119 | 0.180 | 0.180 | 0.202 |

TIME SERIES ANOMALY DETECTION METHOD USING GRU-BASED MODEL

CROSS-REFERENCE TO RELATED APPLICATIONS

This application is the National Stage filing under 35 U.S.C. 371 of Korean Application No. 10-2022-0096757, filed on Aug. 3, 2022, the contents of which are all hereby incorporated by reference herein in their entirety.

BACKGROUND

Field

The present disclosure relates to a time series anomaly detection method using a GRU-based model and, more particularly, to a time series anomaly detection method that calculates a sum of similarities between variables and reflects importance in predicting data at a target point in time.

Related Art

An anomaly is a value that is not be classified into a specific designated group, and refers to data outside upper and lower limits of a normal group. Anomaly detection plays an important role in deriving high-quality statistical analysis results. In particular, it is important to select an appropriate detection method because the proportion of outliers may vary depending on an anomaly defining method, and may vary depending on the distribution of data even if the same method is applied.

In a conventional time series anomaly detection system, the importance of variables was not considered. In this case, there is a problem in that different importance of a sensor related to total system management and a sensor related to end system management in one system is not properly reflected. Thus, it is required to reflect a relationship according to the importance of variables in order to improve the performance of the conventional time series anomaly detection system.

SUMMARY

The present disclosure provides a time series anomaly detection method which calculates a sum of similarities between variables and reflects importance in predicting data at a target point in time.

In an aspect, a time series anomaly detection method using a GRU-based model is provided. The method includes inputting time series data from a predetermined second to 1 second before a target point in time into a stacked GRU, outputting an output of the stacked GRU after passing through a fully connected layer, adding data from the predetermined second before the target point in time to an output value that has passed through the fully connected layer via a skip connection, and learning the GRU-based model to obtain predicted data at the target time point through actual data at the target time point and mean square error (MSE) loss on the basis of the added data. A similarity calculation unit is additionally provided to the GRU-based model, and the similarity calculation unit receives the time series data, generates latent variables, calculates a sum of similarities, and reflects importance of the latent variables, thereby learning the GRU-based model.

A method in which the similarity calculation unit reflects the importance of the latent variables in learning of the GRU-based model may include inputting the time series data into an autoencoder, outputting the same data as the input time series data and generating the latent variables when the autoencoder is learned by compressing and restoring the input time series data on a time axis, obtaining a matrix value by calculating mutual similarity for all of the generated latent variables, calculating a sum of similarities of the latent variables on the basis of the matrix value, and multiplying the calculated sum of similarities by the actual data at the target point in time and the predicted data of the target point in time.

The calculated mutual similarity may be cosine similarity.

The importance of the latent variables may be proportional to the sum of similarities of the latent variables.

The time series data may be time series data at an interval of 1 second from the predetermined second to 1 second before the target point in time.

A time series anomaly detection method using a GRU-based model according to an embodiment of the present disclosure provides the following effect. This calculates a sum of similarities between variables and reflects importance in predicting data at a target point in time, so that the performance of a time series anomaly detection system can be improved.

BRIEF DESCRIPTION OF THE DRAWINGS

FIG. 1 is a diagram illustrating a conventional GRU-based model.

FIG. 2 is a diagram illustrating a GRU-based model to which a similarity calculation unit reflecting the importance of variables is added, according to a disclosed embodiment.

FIG. 3 is a flowchart illustrating a time series anomaly detection method using a GRU-based model according to a disclosed embodiment.

FIG. 4 is a flowchart illustrating a method of reflecting the importance of variables in learning of a GRU-based model according to a disclosed embodiment.

FIG. 5 is a graph in which time series anomaly detection is performed using a conventional GRU-based model.

FIG. 6 is a graph in which time series anomaly detection is performed using a GRU-based model according to a disclosed embodiment.

FIG. 7 is a table evaluating the performance of time series anomaly detection for each dataset for the conventional GRU-based model and the GRU-based model according to the disclosed embodiment.

DESCRIPTION OF EXEMPLARY EMBODIMENTS

Hereinafter, an embodiment of the present disclosure will be described in detail with reference to the accompanying drawings. However, it is to be understood that the present description is not intended to limit the present disclosure to a specific embodiment. When it is determined that the detailed description of the known art related to the present disclosure may be obscure the gist of the disclosure, the detailed description thereof will be omitted.

Figure 2:
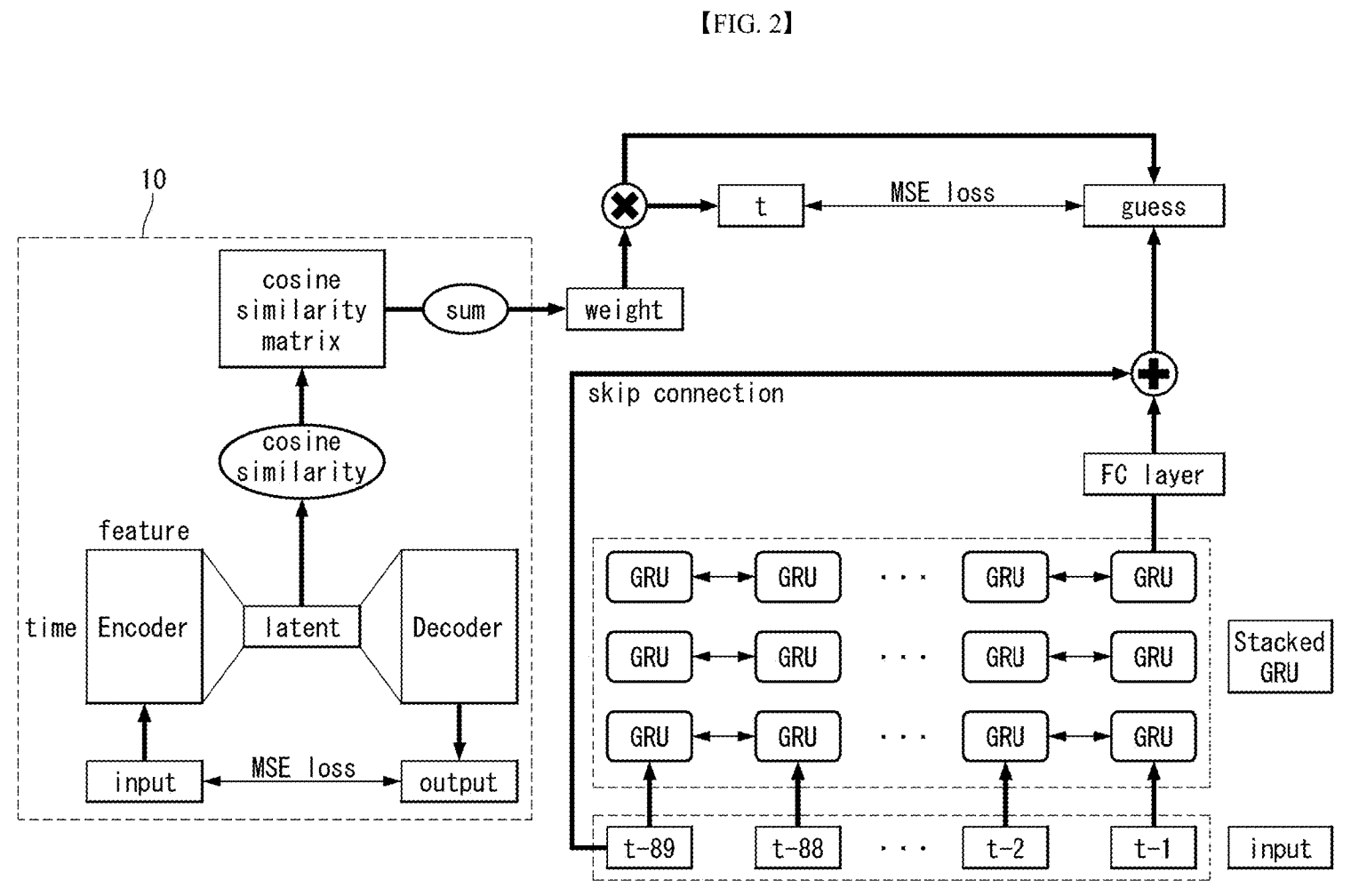

FIG. 1 is a diagram illustrating a conventional GRU-based model, and FIG. 2 is a diagram illustrating a GRU-based model to which a similarity calculation unit reflecting the importance of variables is added, according to a disclosed embodiment.

An operation of the GRU-based model according to the disclosed embodiment is as follows.

In the GRU-based model, 89 pieces of time series data from 89 seconds to 1 second before a target point in time t are input into a stacked GRU. An output of the stacked GRU is output after passing through a fully connected layer.

A value output after passing through the fully connected layer is combined with the data of 89 seconds before the target point in time via skip connection. On the basis of the combined data, the GRU-based model is learned to predict t-second data through actual t-second data and MSE loss.

In the disclosed embodiment, the GRU-based model may be a model to which a module 10 reflecting the relationship of variables, i.e., the importance is added. Although the module 10 is referred hereinafter to as a similarity calculation unit, it is to be noted that this may be referred to as a different name and a function thereof is not limited by a specific name.

An operation of the similarity calculation unit according to the disclosed embodiment is as follows.

89 pieces of time series data from 89 seconds to 1 second before the target point in time t are input into an autoencoder of the similarity calculation unit. The autoencoder is learned while being compressed on a time axis to generate latent variables and restoring on the time axis to obtain the same output as the input data. Since the latent variables are compressed with respect to time, information about the flow of time is compressed in the latent variables.

If the flow of time between the latent variables is similar, a mutual relationship may be interpreted as being high. On the other hand, if the flow of time is not similar, the mutual relationship may be interpreted as being low. Thus, the relationship between the latent variables may be determined through the calculation of similarity between the latent variables. According to the disclosed embodiment, the similarity may be cosine similarity, and a calculation equation is as follows.

$$similarity = \cos(\Theta) = \frac{A \cdot B}{\|A\|\|B\|} \qquad \text{[Equation 1]}$$

The cosine similarity corresponds to a value obtained by dividing the product (A×B) of two vectors by the product of the L2 norms of the two vectors for feature vectors A and B. In the disclosed embodiment, for first and second latent variables, the cosine similarity may correspond to a value obtained by dividing the product of the first and second latent variables by the product of the L2 norms of the first and second latent variables.

According to the disclosed embodiment, if one variable has a high similarity with other variables, it may be interpreted as a variable of high importance. On the other hand, if one variable has a low similarity with other variables, it may be interpreted as a variable of low importance. Thus, the sum of the similarities of the latent variables may mean the importance.

The calculated sum of the similarities of the latent variables is multiplied by the actual data of t seconds, which are the target point in time and the predicted data on t seconds, so that the importance of the variables may be reflected. In order to obtain the sum of the similarities of the latent variables, a matrix value is calculated by calculating the mutual similarity for all of the generated latent variables.

The following table is a table showing values for a 4×4 matrix according to an exemplary embodiment in which four variables are v1, v2, v3, and v4. The values indicated in the table mean exemplary similarity values calculated between the variables.

TABLE 1

|  | v1 | v2 | v3 | v4 |
|---|---|---|---|---|
| v1 | 1 | 0.8 | 0.2 | 0.5 |
| v2 | 0.8 | 1 | 0.3 | 0.7 |
| v3 | 0.2 | 0.3 | 1 | 0.4 |
| v4 | 0.5 | 0.7 | 0.4 | 1 |

The sum of the similarities for the variables is 2.5 (1+0.8+0.2+0.5) for v1, 2.8 (0.8+1+0.3+0.7) for v2, 1.9 (0.2+0.3+1+0.4) for v3, and 2.6 (0.5+0.7+0.4+1) for v4. Each sum of similarities calculated in this way is multiplied by actual data and predicted data.

FIG. 3 is a flowchart illustrating a time series anomaly detection method using a GRU-based model according to a disclosed embodiment.

In the disclosed embodiment, the time series anomaly detection method using the GRU-based model may include inputting time series data from a predetermined second to 1 second before a target point in time into a stacked GRU, outputting an output of the stacked GRU after passing through a fully connected layer, adding data from the predetermined second before the target point in time to an output value that has passed through the fully connected layer via a skip connection, and learning the GRU-based model to obtain predicted data at the target time point through actual data at the target time point and mean square error (MSE) loss on the basis of the added data. A similarity calculation unit may be additionally provided to the GRU-based model, and the similarity calculation unit may receive the time series data, may generate latent variables, may calculate a sum of similarities, and may reflect importance of the latent variables, thereby learning the GRU-based model.

FIG. 4 is a flowchart illustrating a method of reflecting the importance of variables in learning of a GRU-based model according to a disclosed embodiment.

In the disclosed embodiment, a method in which the similarity calculation unit reflects the importance of the latent variables in learning of the GRU-based model may include inputting the time series data into an autoencoder, outputting the same data as the input time series data and generating the latent variables when the autoencoder is learned by compressing and restoring the input time series data on a time axis, obtaining a matrix value by calculating mutual similarity for all of the generated latent variables, calculating a sum of similarities of the latent variables on the basis of the matrix value, and multiplying the calculated sum of similarities by the actual data at the target point in time and the predicted data of the target point in time.

FIG. 5 is a graph in which time series anomaly detection is performed using a conventional GRU-based model, and FIG. 6 is a graph in which time series anomaly detection is performed using a GRU-based model according to a disclosed embodiment.

In both cases, time series anomaly detection was performed using a HAI 22.04 dataset. A first line (L₁) shows an error value, and a second line (L₂) shows an actual attack section. A third line (L₃) denotes a boundary value for determining normality and attack. It can be seen that the graph of FIG. 6 clearly differentiates normality from attack near the boundary value compared to the graph of FIG. 5.

FIG. 7 is a table evaluating the performance of time series anomaly detection for each dataset for the conventional GRU-based model and the GRU-based model according to the disclosed embodiment.

The performance was evaluated by detecting the time series anomaly using HAI 22.04 and WADI datasets. As the result of the experiment, performance improvement was observed in most of performance evaluation indicators. In particular, when using the HAI 22.04 dataset, a performance improvement of approximately 40% for a Precision item and a performance improvement of approximately 80% for in a TaP item may be confirmed. In the case of using the WADI dataset, a performance improvement of about 60% may be confirmed for a TaP item.

As described above, the present disclosure calculates a sum of similarities between variables using a GRU-based model to which a similarity calculation unit is added and reflects importance in predicting data at a target point in time, thus improving the performance of a time series anomaly detection system.

Meanwhile, the embodiments of the present disclosure can be implemented as computer readable codes in a computer readable recording medium. The computer readable recording medium includes all types of recording devices in which data that can be read by a computer system is stored.

Examples of the computer readable recording medium may include Read-Only Memory (ROM), Random Access Memory (RAM), CD-ROM, magnetic tape, floppy disk, optical data storage devices, etc., and also include implementations in the form of carrier waves (e.g., transmission over the Internet). Further, the computer readable recording medium may be distributed to computer systems connected through a network, so that computer readable codes may be stored and executed in a distributed manner. In addition, functional programs, codes, and code segments for implementing the present disclosure can be easily inferred by programmers in the technical field to which the present disclosure belongs.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A time series anomaly detection method using a GRU-based model, the method comprising:

inputting time series data from a predetermined second to 1 second before a target point in time into a stacked GRU;

outputting an output of the stacked GRU after passing through a fully connected layer;

adding data from the predetermined second before the target point in time to an output value that has passed through the fully connected layer via a skip connection; and learning the GRU-based model to obtain predicted data at the target time point through actual data at the target time point and mean square error (MSE) loss on the basis of the added data, wherein a similarity calculation unit is additionally provided to the GRU-based model, wherein the similarity calculation unit receives the time series data, generates latent variables, calculates a sum of similarities, and reflects importance of the latent variables, thereby learning the GRU-based model, and wherein a method in which the similarity calculation unit reflects the importance of the latent variables in learning of the GRU-based model comprises:

inputting the time series data into an autoencoder;

outputting the same data as the input time series data and generating the latent variables when the autoencoder is learned by compressing and restoring the input time series data on a time axis;

obtaining a matrix value by calculating mutual similarity for all of the generated latent variables;

calculating a sum of similarities of the latent variables on the basis of the matrix value; and multiplying the calculated sum of similarities by the actual data at the target point in time and the predicted data of the target point in time.

2. The method of claim 1, wherein the calculated mutual similarity is cosine similarity.

3. The method of claim 2, wherein the cosine similarity is a value obtained by dividing a product of first and second latent variables by a product of a L2 norm of the first and second latent variables.

4. The method of claim 1, wherein the importance of the latent variables is proportional to the sum of similarities of the latent variables.

5. The method of claim 1, wherein the time series data is time series data at an interval of 1 second from the predetermined second to 1 second before the target point in time.

* * * * *